United States Patent
Fachinger et al.

[19]

[11] Patent Number: 6,126,099
[45] Date of Patent: Oct. 3, 2000

[54] PUMPING STATION FOR A COOLING AND LUBRICATING FLUID CONTAINING PARTICULATE MATTER

[75] Inventors: Alfons Fachinger, Bischofsheim, Germany; Mark Janssen, Beringen, Belgium; Stefan Wilden, Simmerath, Germany

[73] Assignees: CAE Beyss GmbH, Aachen; Filterwerk Mann + Hummel GmbH, Ludwigsburg, both of Germany

[21] Appl. No.: 08/939,303

[22] Filed: Sep. 29, 1997

[30]   Foreign Application Priority Data

Sep. 27, 1996 [DE] Germany ............... 296 16 893 U

[51] Int. Cl.⁷ .................................................. B02C 19/00
[52] U.S. Cl. ..................... 241/81; 241/101.2; 409/137; 409/253
[58] Field of Search ................. 83/168, 171; 451/444; 210/168; 409/137, 253; 241/101.2, 81

[56]   References Cited

U.S. PATENT DOCUMENTS

| | | | |
|---|---|---|---|
| 4,377,259 | 3/1983 | Areaux et al. | 241/81 |
| 5,380,446 | 1/1995 | Bratten | 409/137 |
| 5,800,104 | 9/1998 | Miyano | 409/137 |

FOREIGN PATENT DOCUMENTS

| | | | |
|---|---|---|---|
| 0441170 | 8/1991 | European Pat. Off. | 409/137 |
| 0518095 | 7/1994 | European Pat. Off. | |
| 29510514 U | 10/1995 | Germany . | |
| 56-27762 | 3/1981 | Japan | 409/137 |
| 0032546 | 2/1991 | Japan | 409/137 |
| 4-101746 | 4/1992 | Japan | 409/137 |

*Primary Examiner*—Mark Rosenbaum
*Attorney, Agent, or Firm*—W. F. Fasse; W. G. Fasse

[57]   ABSTRACT

A pumping station for pumping a cooling and lubricating fluid containing particulate matter such as machining chips has a compact structure with a relatively low total structural height, while still assuring that the chips are conveyed with the fluid to the pump suction inlet, without settling-out or accumulating in the apparatus. The pumping station (1) includes a collecting container (5) with at least one pump (6) arranged therein, a chip breaker (7) and a supply conduit arrangement. The supply conduit arrangement includes a supply line (2) through which the cooling and lubricating fluid containing the machining chips is received from a machining tool or transfer station. Furthermore, two branch lines (3) and (4) are interposed and connected between the supply line (2) and the collecting container (5). A first branch line (3) conveys the fluid, from which the chips have been removed, with a slight downward slope toward the collecting container (5). The second branch line (4) conveys the chips that have been removed from the fluid flow. A scraper conveyor or the like conveys the chips upward through the second branch line (4), and the outlet end of the branch line (4) is arranged directly above the chip breaker (7), which in turn is arranged above the outlet end of the fluid conveying branch line (3). The comminuted chips thus fall from the breaker (7) directly into the flow of fluid, in which the chips are then entrained and carried along into the sump (13) of the collecting container (5), where the chips and fluid are sucked and pumped away by the pump (6).

19 Claims, 3 Drawing Sheets

PUMPING STATION FOR A COOLING AND LUBRICATING FLUID CONTAINING PARTICULATE MATTER

FIELD OF THE INVENTION

The invention relates to a pumping station for pumping a cooling and lubricating fluid that contains particulate matter such as chips, shavings, turnings, cutting dust, and the like from a machining operation.

BACKGROUND INFORMATION

Pumping stations of the above mentioned type are known in the art and generally have a supply line or conduit through which the cooling and lubricating fluid containing particulate matter is delivered, a collecting container connected to the supply line, and a pump communicating with the collecting container. A discharge line is connected to the pressure output side of the pump. Such generally known pumping stations are used in connection with machine tools, such as boring, cutting, or milling machines, for pumping away from the machine tools, for example through pipe conduits, the cooling and lubricating fluid that contains any chips or shavings arising during the chip-removal machining of workpieces. Separate equipment arranged at a separate location will then separate the particulate matter such as cutting chips from the cooling and lubricating fluid, so that the fluid can be reused in the machining process.

European Patent Publication 0,518,095 discloses a pumping station in which comminuted machining chips are directed into a catching or collecting container by means of the flow of the cooling and lubricating fluid. The floor of the collecting container has a slight pitch or slope down to the deepest point of the floor of the container, where a pump is arranged. Thus, the mixture of cooling and lubricating fluid with machining chips therein is conveyed by gravity into the deepest portion of the floor of the container so that the fluid and chips together will be sucked into the pump.

In order to reliably convey machining chips and the like into the suction area of the pump even when there is a relatively low proportion or flow rate of the cooling and lubricating fluid, it was discovered in the art that it is necessary to use a funnel-shaped collecting container having relatively steeply sloped side walls. Due to such relatively steeply sloped side walls, the machining chips are reliably conveyed by gravity into the suction area of the pump arranged deep within the base of the container.

In the above mentioned known pumping stations, it has been recognized as a disadvantage that either the reliable conveyance of machining chips can only be achieved with relatively low supply volume flows of the chips, or the collecting containers must have a relatively high total structural height to provide for a sufficiently steep slope of the walls and a sufficient collecting volume. In order to reduce the total structural height of the apparatus above floor level, it has previously been typical to arrange or recess the known pumping stations into or below the floor level. However, in view of the danger of polluting ground water resources in the event of any leakage, and thus as required by environmental protection regulations, the pumping stations arranged below floor level in this manner have required a double-walled collecting container securely anchored in a foundation constructed below the shop floor. Such an arrangement is quite complicated and expensive.

In order to try to achieve a pumping station that does not need to be arranged under the floor level, yet still achieves an optimal or adequate conveying of the machining chips by means of a pump, German Utility Model Publication 295 105 14 U1 discloses a pumping system having a collecting container in the form of a cylindrical pot with an essentially flat planar container floor. A wiper or sweeper is provided to continuously run over the flat container floor in order to convey to the transport pump the machining chips that come to rest on the container floor. In such a known arrangement, the chips are continuously positively conveyed until just before the suction opening of the pump by the wiper or sweeper that is rotationally driven by a suitable drive arrangement. In order to contact, collect, and convey the chips and deliver them to the pump, the sweeper or wiper has sweeper arms that rest directly on the floor of the container. Nonetheless, some chips become caught between the top surface of the container floor and the bottom surface of the sweeper arms, and in this manner the sweeper arms become jammed against the container floor. In order to avoid this, the known arrangement further provides means for lifting the sweeper or the sweeper arms from the container floor. It has been found that this known arrangement is complicated and costly in its production and installation, and is also not very reliable in operation, due to the above described problems of the rotational sweeper or wiper and its drive arrangement, and especially due to the additional required means for avoiding jamming of the sweeper arrangement.

SUMMARY OF THE INVENTION

In view of the above it is the aim of the invention to provide a pumping station of the above described general type that has a simple construction which may be entirely arranged above the floor level of a machine shop or the like, and which avoids the need of an active sweeper or wiper arranged over the floor of the collecting container, yet nonetheless positively and reliably conveys the machining chips to the suction side of the pump. Further objects of the invention are to avoid or overcome the additional disadvantages of the prior art, and to achieve further advantages, as apparent from the present description.

The above objects have been achieved in a pumping station for pumping a cooling and lubricating fluid containing particulate matter, according to the invention, including a collecting container, at least one pump arranged in or at the collecting container, a supply line supplying the cooling and lubricating fluid and the particulate matter into the collecting container, and a discharge line connected to the pressure outlet side of the pump. Especially according to the invention, the general supply line includes two branch lines, namely a first branch line that leads with at least a slight downward slope into the collecting container and conveys the cooling and lubricating fluid therein, and a second branch line that climbs upward and then opens at a location above the collecting container for conveying the particulate matter therein. The outlet openings of the two branch lines are positioned and arranged relative to one another in such a manner that the stream or flow of particulate matter falling into the collecting container from the second branch line falls directly onto and into the stream or flow of cooling and lubricating fluid that flows into the collecting container from the first branch line. Throughout this description, the term "line" means any conduit, pipe, hose, duct, channel or the like through which the respective materials may be conveyed.

A first advantage of the arrangement according to the invention, in which the cooling and lubricating fluid on the one hand and the flow of chips or other particulate matter on the other hand are separately conveyed through two separate branch lines, is that it is possible to optimize the construction, arrangement and operation of each branch line for conveying the particular goods or material that is to be transported therein. Thus, for example, it is sufficient for the first branch line that will transport the cooling and lubricating fluid (without the particulate matter), to have merely a slight downward slope in the direction toward the collecting container, and that this slight slope continues and extends across the floor of the container to the location at which the pump suction inlet is arranged. Since the particulate matter is conveyed separately from the cooling and lubricating fluid, the slight downward slope of the first branch line for transporting the fluid is sufficient, because there is no particulate matter to settle out and become caught or lodged in this conduit branch.

On the other hand, a scraper conveyor or flight conveyor device, which itself may be embodied in any conventional manner, can be provided in order to transport the chips or other particulate matter through the associated second branch line that slopes upward and finally opens at a location above the collecting container. The scrapers or conveying paddles or the like of the above mentioned scraper conveyor device are not comparable and do not suffer the same disadvantages as the above described rotating sweeper or wiper arms that are used in the apparatus according to the prior art. Most importantly, the scrapers that can be used in the present apparatus are moved linearly upward along the conveyor trough or path and are lifted up completely away from the surface of the conveyor path each time the respective scrapers pass over and run around the end of the bottom forward advance web of the conveyor. In this manner, any chips or other particulate matter that may have become caught between the scraper or conveyor paddle and the surface of the conveyor path will be released at the end of the conveyor path when the respective scrapers are lifted up. Contrary thereto, the rotating sweeper arms used in the apparatus according to the prior art can catch chips between the sweeper arm and the container floor, with no opportunity for the chips to be released, so that the chips may remain caught between the sweeper arm and the floor over the course of numerous rotations of the sweeper arm, which leads to a rather rapid wear of the container floor.

A further substantial advantage is achieved by the pumping station according to the invention due to the particular arrangement of the respective outlets of the two branch conduits. Since the flow of chips falling into the collecting container from the upper branch line falls directly onto the flow of cooling and lubricating fluid that flows into the collecting container from the bottom branch line, the chips will free-fall into, mix with, be entrained in, and be pulled along with the flow of the cooling and lubricating fluid in the flow direction thereof, without first piling or accumulating onto the container floor. In this manner, the frictional resistance between the chips and the floor of the collecting container will be overall minimized, because the chips remain entrained in the fluid flow.

In a further detailed embodiment of the invention, the apparatus includes a chip breaker and a supply funnel or feed hopper arranged above the collecting container. In this embodiment, the upper branch line has a sufficient incline or total end height, and is equipped with a suitable scraper conveyor arrangement so as to convey the chips directly into the feed hopper of the chip breaker. Due to the height difference between the two outlets of the two branch lines, the chip breaker that is arranged below the outlet of the upper branch line conveying the chips is still high enough that its outlet is above the outlet of the lower branch line conveying the cooling and lubricating fluid. In this manner, the chip breaker may be integrated into the apparatus, while still maintaining the configuration by which the stream of chips falls down into the stream of cooling and lubricating fluid. Preferably, the floor of the collecting container includes at least one sloped floor part that slopes downward toward the pump inlet, whereby the outlet of the chip breaker opens directly above this sloped floor part of the collecting container and the sole or floor of the branch line conveying the cooling and lubricating fluid smoothly transitions into this sloped floor part of the collecting container.

The inventive apparatus is able to assure a reliable transport or conveying of the chips to the suction inlet of the pump, even in the event of a disadvantageous relationship between the volume flow of chips and the volume flow of cooling and lubricating fluid. In order to achieve this, the invention provides a flushing conduit that communicates into the transition area between the outlet of the branch line conveying the cooling and lubricating fluid and the sloping floor part of the collecting container connected thereto. Through this flushing conduit, a supplemental flow of cleaned cooling and lubricating fluid may be provided directly at a critical location in order to ensure that the flow of chips remains entrained in a sufficient quantity of fluid. This flushing fluid may be recirculated through the apparatus. More specifically, a valve may be arranged at the outlet of the flushing conduit, so that the volume flow of the cleaned cooling and lubricating fluid that is recirculated for the purpose of flushing can be regulated as needed between zero and a maximum amount.

According to a further embodiment of the invention, the floor of the collecting container includes a substantially horizontal floor part forming a container sump, and a plurality of sloped floor parts that slope down toward the container sump. The suction inlet of the pump is arranged in the sump. Thus, at least all of the parts of the container floor outside of or away from the suction inlet of the pump are sloped toward the suction inlet of the pump. The slope angle of the floor parts of the collecting container sloping toward the container sump may be embodied so shallowly, i.e. with a relatively slight slope angle, so that a relatively low total structural height can be achieved, and thus the entire pumping station may be arranged above the floor level. At the same time, the slope angle is sufficient, and the entire container floor is so embodied, so as to ensure that all material entering the collecting container, including the particulate matter and the fluid, is reliably conveyed to the suction inlet area of the pump.

A further advantageous arrangement according to the invention provides that two pumps are arranged in the collecting container, with the suction inlets of the two pumps lying at different elevation levels. The two pumps are preferably designed, arranged, and controlled in a circuit, in such a manner that a first pump has its suction inlet at a lower or deeper level and a second pump has its suction inlet at a higher level. More particularly, the first pump with the lower suction inlet is designed to provide a pumping power corresponding to the minimum volume flow of the chip-containing cooling and lubricating fluid that is expected in operation. If the volume flow increases and thus the depth or level of the chip-containing fluid in the collecting container increases and exceeds a normal level, then the second pump with the higher suction inlet will automatically be switched on as a safety measure, until such time at which the normal fluid level has again been achieved. This arrangement assures an efficient and economical operation under normal expected conditions, and also allows an adequate measure of excess pumping capacity to handle larger volume flows.

BRIEF DESCRIPTION OF THE DRAWINGS

In order that the invention may be clearly understood, it will now be described in connection with an example embodiment with reference to the drawings, wherein.

DETAILED DESCRIPTION OF PREFERRED EXAMPLE EMBODIMENTS AND OF THE BEST MODE OF THE INVENTION

In a machining station, which is not shown, a chip-removing machining operation is being carried out while using a cooling and lubricating fluid. The removed chips are entrained in the flow of cooling and lubricating fluid, which flows from a transfer line or transfer station, which is not shown, through a supply line 2 to a pumping station 1. Interposed between the pumping station 1 and the supply line 2, and specifically connected to an inlet junction 2A a short distance before or upstream of the pumping station 1, are two branch lines 3 and 4.

A first branch line 3 is connected coaxially in line with the supply line 2, and both the supply line 2 and the first branch line 3 slope downward with a slight slope angle toward the pumping station 1, for example having a slope angle of less than 5° or even less than 3°. The proper slope angle for the supply line 2 is known in the art for ensuring proper flow of the fluid and chips. A second branch line 4 is connected to the supply line 2, and rises or slopes upward from the supply line 2 toward the pumping station 1, at a relatively steep slope angle, for example in range from 30° to 60° or especially 40° to 45°.

The first branch line 3 is intended to have the cooling and lubricating fluid flow therethrough to the pumping station 1 by means of the natural gravitational drop or flow of the fluid along the slight downward slope of the branch line 3. On the other hand, the chips or other particulate matter are lifted and conveyed up through the second branch line 4 toward the pumping station 1 by means of any conventional particulate matter conveyor arrangement, such as a ribbed conveyor belt, a screen conveyor, a screw conveyor or preferably a scraper or flight conveyor device 4A. Thus, the scraper conveyor device 4A or other particle conveyor separates the chips from the flow of cooling and lubricating fluid at the inlet junction 2A and lifts as the chips up through the second branch line 4. The conveyor arrangement may be driven in any conventionally known manner, such as by a motor drive 4B. An additional chip separator, for example including a screen, grating or gravitational chip separator sump, may be provided in the inlet junction 2A.

Figure 3:
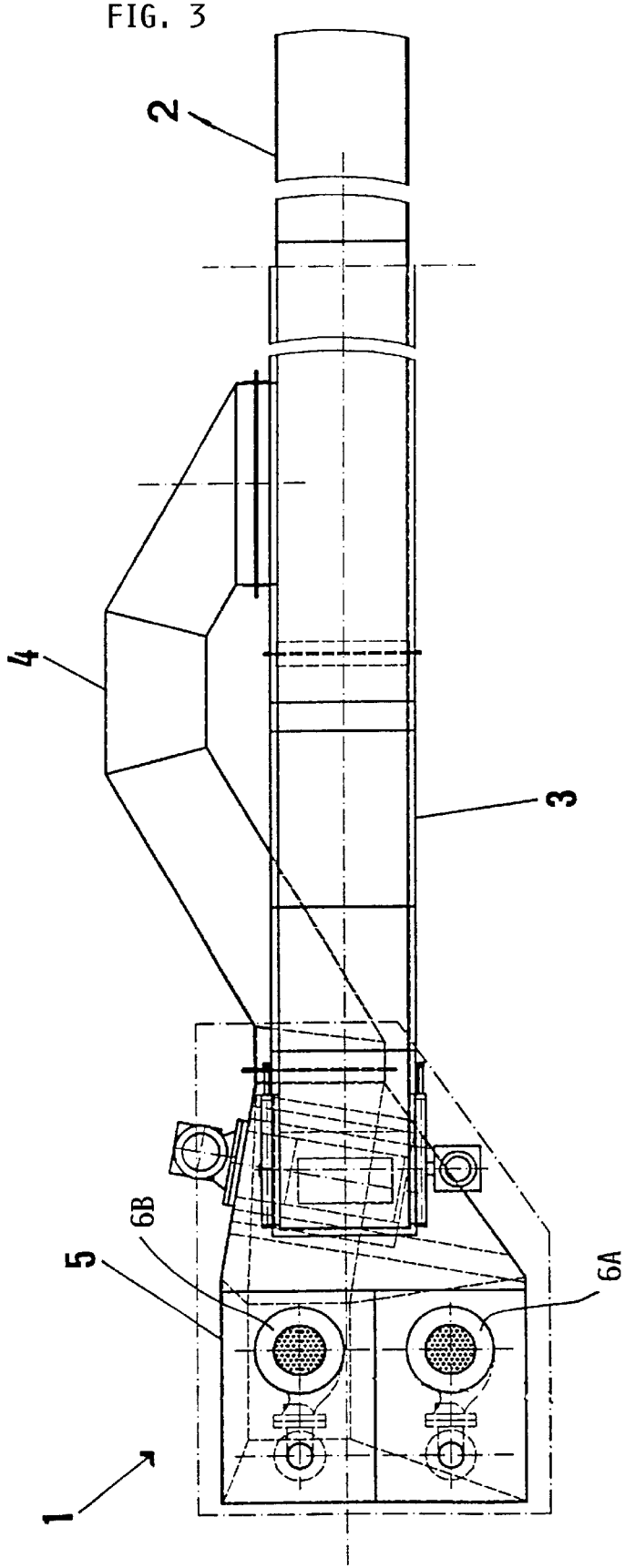
FIG. 3 shows a top plan view, partially broken open, of the apparatus of FIG. 1.

As shown especially in FIG. 3, the second or upper branch line 4 branches from the side of the supply line 2 and then curves laterally convexly while rising upward to come back into alignment over the first or lower branch line 3. As an alternative, the second or upper branch line 4 may follow a straight path aligned with the vertical plane of the supply line 2, while the first or lower branch line 3 follows a curved path, and as a further alternative, both branch lines 3 and 4 may be vertically aligned along straight paths one above the other, as long as a proper junction is provided for coupling the two branch lines 3 and 4 to the supply line 2 in such a manner that the branch line 3 conveys substantially particle-free cooling and lubricating fluid, while the branch line 4 conveys the chips or other particulate matter substantially free of the fluid.

The pumping station 1 proper essentially comprises a collecting container 5, two pumps 6A and 6B (as especially seen in FIG. 2) and a chip breaker 7. The collecting container 5 has a floor that includes a substantially horizontal floor part 12, and four tilted or sloped floor parts 8, 9, 10 and 11. More specifically, the four floor parts 8, 9, 10 and 11 respectively adjoin and surround the horizontal floor part 12, and each floor part 8, 9, 10 and 11 respectively slopes slightly upwardly away from the horizontal floor parts 12, for example with respective slope angles in the range from 6° to 50°. In this manner, the five floor parts 8, 9, 10, 11 and 12 together form a container sump 13.

Figure 1:
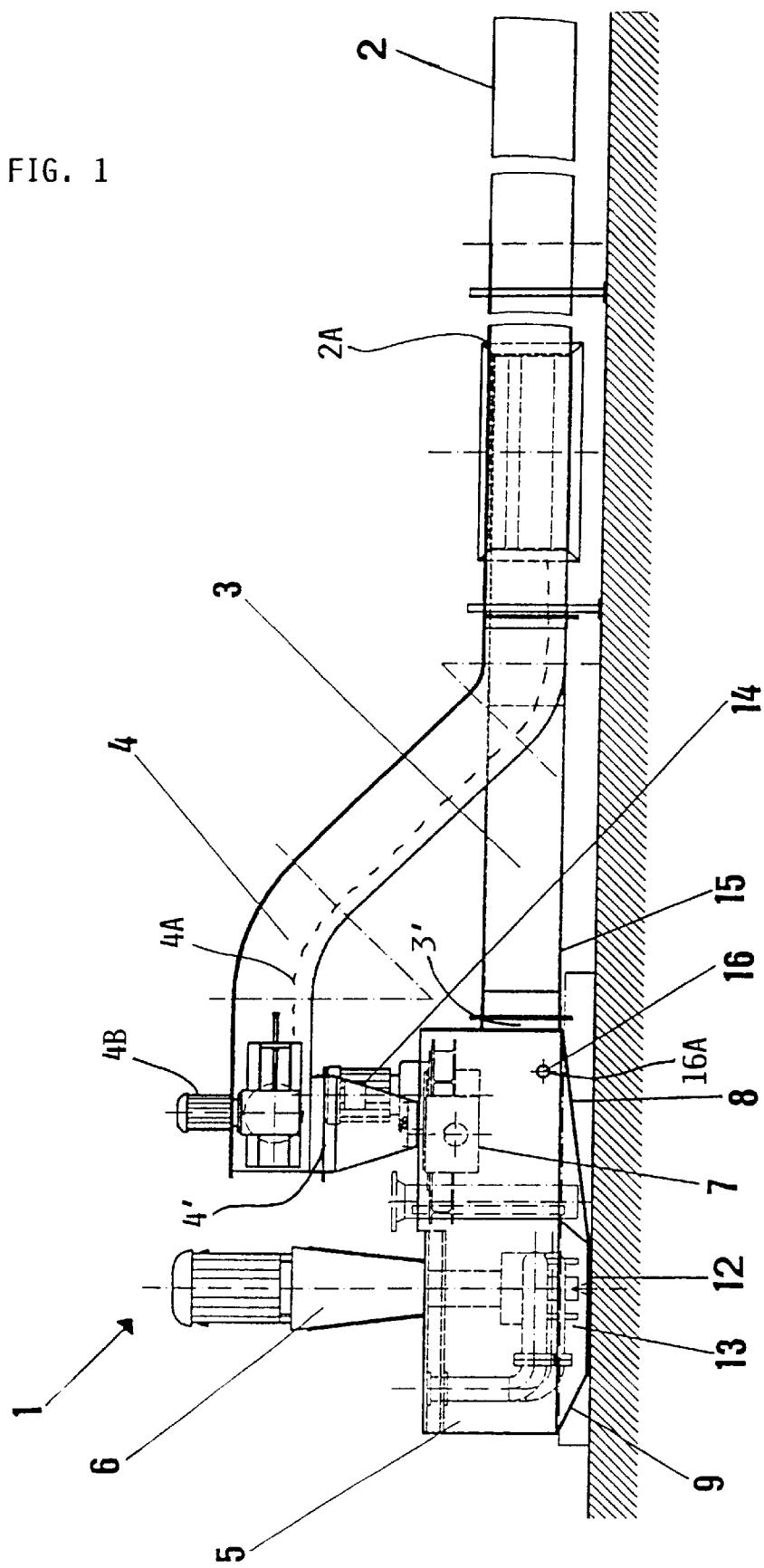
FIG. 1 shows a lengthwise side view, partially in section and partially broken open, of a pumping station apparatus according to the invention.
Figure 2:
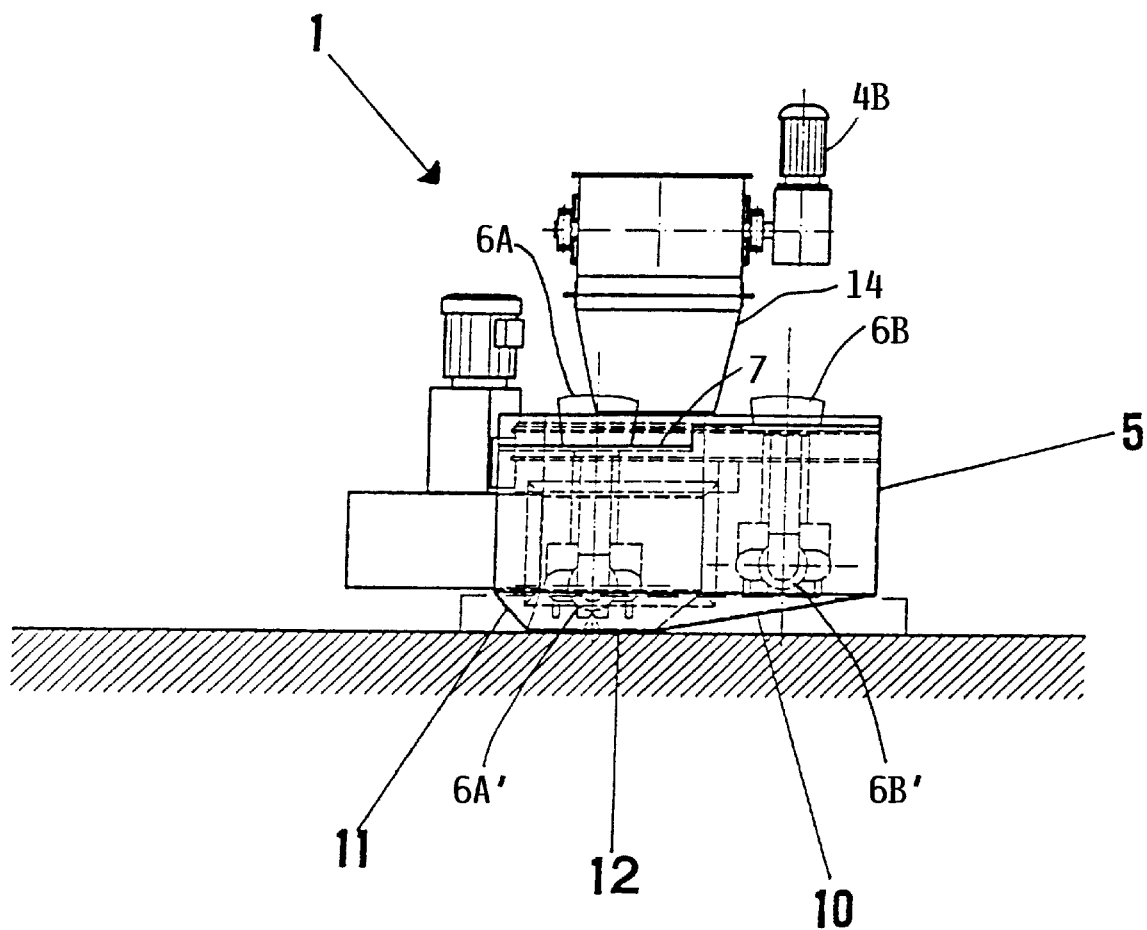
FIG. 2 shows an end view, partially in section and partially broken open, of the apparatus of FIG. 1.

As shown especially in FIG. 2, the two pumps 6A and 6B are arranged within the collecting container 5 in such a manner that the respective suction heads 6A' and 6B' of the two pumps 6A and 6B are positioned at two different elevations or levels within the container 5. The suction head 6A' of the first pump 6A is arranged at a lower or deeper level within the container sump 13, while the second pump 6B has its suction head 6B' at a higher level. By means of level float switches or the like, the two pumps are automatically switched on dependent upon the liquid level of fluid collected in the collecting container 5, such that only one or the other of the pumps or both pumps 6A and 6B will be switched on at any time.

To collect and feed the particulate matter such as chips to the chip breaker 7, a feed hopper 14 is arranged directly above the chip breaker 7, and directly below the outlet opening 4' of the second or upper branch line 4. The outlet opening of the chip breaker 7 is located above the floor part 8 which slopes toward the horizontal floor part 12 and toward the pumps 6A and 6B from the outlet opening 3' of the first branch line 3, for example at an angle of at least 5°, and especially at least 6° or about 8°, and generally not needing to exceed 12 or 15°. More specifically, the sole or floor 15 of the first branch line 3 conveying the cooling and lubricating fluid transitions smoothly into the sloping floor part 8. Thus, the comminuted chips exiting from the chip breaker 7 fall down onto the flow of cooling and lubricating fluid that has been discharged from the first branch line 3 and is flowing across the sloping floor part 8. Thus, the flow of cooling and lubricating fluid entrains and pulls along the comminuted chips in a continuous manner, so that the comminuted chips do not settle-out or accumulate on the sloping floor part 8.

As a safety precaution to assure reliable flushing conveyance of the chips if unusual operating conditions arise in which the relationship or ratio between the volume flow rate of chips on the one hand and the volume flow rate of the cooling and lubricating fluid on the other hand is so unfavorable that the flushing effect of the cooling and lubricating fluid over the sloping floor part 8 is insufficient to ensure that the chips will not accumulate or settle-out thereon, a flushing conduit 16 is connected in this area. Namely, the flushing conduit 16 opens into the collecting container 5 in the upper area of the sloping floor part 8 near the outlet 3' of the first branch line 3, and preferably upstream of the location at which chips fall in from the chip breaker 7. The flushing conduit 16 is provided with a partial flow of the cooling and lubricating fluid that has already been cleaned, which thereby acts as a chip-free flushing fluid to increase the fluid flow rate over the sloping floor part 8. One or more spray nozzles 16A, and a control valve if desired, may be provided at the outlet end of the flushing conduit 16, to selectively control the volume flow rate of the flushing fluid and to spray the flushing fluid in the form of a conveying stream or jet along the sloping floor part 8 to areas at which chip accumulations may occur, so as to positively flush any such chips into the bottom part 12 of the container sump 13.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims, and all numerical values between the endpoints of any disclosed range of values.

What is claimed is:

1. A pumping station for pumping a fluid that contains particulate matter, comprising:
    a collecting container including a floor pan having a sloped floor part that is arranged to slope downward from a higher location to a lower location;
    first pump having a first suction inlet in communication with said collecting container at said lower location and having a discharge outlet;
    an inlet junction adapted to receive a flow of the liquid containing the particulate matter;
    a first branch line adapted to have the fluid flow therethrough to said collecting container, and having a first inlet end connected to said inlet junction, a first outlet communicating into said collecting container at said higher location, and a downward slope from said first inlet end to said first outlet;
    a second branch line adapted to have the particulate matter move therethrough, and having a second inlet end connected to said inlet junction, a second outlet communicating into said collecting container above said first outlet, and an upward slope from said second inlet end to said second outlet; and
    a flushing fluid conduit that is adapted to have a recirculated partial flow of the fluid conveyed therethrough, and that communicates into said collecting container along said sloped floor part at location adjacent and downstream from said first outlet;
    wherein said second outlet of said second branch line and said first outlet of said first branch line are located and arranged relative to one another such that a particle flow of the particulate matter falling from said second outlet into said collecting container falls onto a fluid flow of the fluid flowing from said first outlet into said collecting container.

2. The pumping station according to claim 1, further comprising a discharge line connected to said discharge outlet of said pump and adapted to have the fluid containing the particulate matter flow therethrough, and an inlet line connected to said inlet junction and adapted to have the fluid containing the particulate matter flow therethrough to said inlet junction.

3. The pumping station according to claim 1, wherein said second outlet is located above a top of said collecting container.

4. The pumping station according to claim 1, wherein said second outlet is located above said first outlet, intersecting a vertical plane passing through a lengthwise axis of said first branch line, and offset from said first outlet horizontally along said vertical plane in a flow-downstream direction away from said first outlet into said collecting container.

5. The pumping station according to claim 1, wherein said first and second branch lines and said inlet junction are so adapted and arranged such that the fluid flowing through said first branch line is substantially free of the particulate matter and the particulate matter moving through said second branch line is substantially free of the fluid.

6. The pumping station according to claim 1, further comprising a chip breaker arranged in or above said collecting container, a feed hopper arranged below said second outlet and connected to and adapted to provide the particulate matter to said chip breaker, and a particle conveyor arranged in said second branch line and adapted to convey the particulate matter through said second branch line, out of said second outlet and into said feed hopper.

7. The pumping station according to claim 6, wherein said particle conveyor comprises a scraper conveyor device.

8. The pumping station according to claim 6, wherein a floor of said first branch line transitions smoothly into said sloped floor part through said first outlet, and wherein said chip breaker has a particle outlet arranged directly above said sloped floor part.

9. The pumping station according to claim 1, wherein said sloped floor part has a slope in the range from 6° to 12°.

10. The pumping station according to claim 1, wherein said floor pan defines a container sump therein, wherein said floor pan further includes a sump bottom part arranged at a lowest point of said container sump and at least one additional sloped floor part, wherein all of said sloped floor parts respectively slope downward toward and join said sump bottom part, and wherein said suction inlet of said pump is arranged at said lower location which is located in said container sump at said sump bottom part.

11. The pumping station according to claim 10, wherein said sump bottom part is horizontal, each of said sloped floor parts respectively has a slope in the range from 6° to 50°, and said floor pan of said collecting container includes no horizontal floor parts other than said sump bottom part.

12. The pumping station according to claim 1, further comprising a second pump having a second suction inlet in communication with said collecting container at a height level above that of said first suction inlet of said first pump.

13. The pumping station according to claim 12, wherein said first and second pumps including said first and second suction inlets are arranged in said collecting container.

14. The pumping station according to claim 1, wherein said downward slope of said first branch line is greater than 0° and less than 5°, and said upward slope of said second branch line is in the range from 30° to 60°.

15. The pumping station according to claim 1, wherein said pumping station does not include any active mechanical wiper device arranged in said collecting container for conveying the particulate matter over said floor pan of said collecting container.

16. A pumping station for pumping a fluid that contains particulate matter, comprising:
    a collecting container;
    a first pump having a first suction inlet in communication with said collecting container and a discharge outlet;
    an inlet junction adapted to receive a flow of the fluid containing the particulate matter;
    a first branch line adapted to have the fluid flow therethrough to said collecting container, and having a first inlet end connected to said inlet junction, a first outlet communicating into said collecting container, and a downward slope from said first inlet end to said first outlet;
    a second branch line adapted to have the particulate matter move therethrough, and having a second inlet end connected to said inlet junction, a second outlet communicating into said collecting container above said first outlet, and an upward slope from said second inlet end to said second outlet; and an inlet line connected to said inlet junction and adapted to have the fluid containing the particulate matter flow therethrough to said inlet junction;

wherein said first branch line is arranged in axial alignment with said inlet line;

wherein said second branch line between said second inlet end and said second outlet curves laterally convexly away from a vertical plane passing through an axis of said first branch line; and wherein said second outlet of said second branch line and said first outlet of said first branch line are located and arranged relative to one another such that a particle flow of the particulate matter falling from said second outlet into said collecting container falls onto a fluid flow of the fluid flowing from said first outlet into said collecting container.

17. The pumping station according to claim 16, wherein said second outlet is located above said first outlet, intersecting said vertical plane passing through said axis of said first branch line, and offset from said first outlet horizontally along said vertical plane in a flow-downstream direction away from said first outlet into said collecting container.

18. The pumping station according to claim 16, further comprising a chip breaker arranged in or above said collecting container, a feed hopper arranged below said second outlet and connected to and adapted to provide the particulate matter to said chip breaker, and a particle conveyor arranged in said second branch line and adapted to convey the particulate matter through said second branch line, out of said second outlet and into said feed hopper.

19. The pumping station according to claim 16, wherein said downward slope of said first branch line is greater than 0° and less than 5°, and said upward slope of said second branch line is in the range from 30° to 60°.

* * * * *

UNITED STATES PATENT AND TRADEMARK OFFICE
CERTIFICATE OF CORRECTION

PATENT NO. : 6,126,099
DATED : October 3, 2000
INVENTOR(S) : Fachinger et al..

It is certified that error appears in the above-identified patent and that said Letters Patent is hereby corrected as shown below:

Col. 7, line 20, before "first" insert --a--;
Col. 7, line 23, after "the" replace "liquid" by --fluid--.

Signed and Sealed this

First Day of May, 2001

Attest:

NICHOLAS P. GODICI

Attesting Officer

Acting Director of the United States Patent and Trademark Office